3,098,064
WATER-SOLUBLE DISAZO DYES CONTAINING TWO THIOSULFURIC ACID GROUPS
Werner Schultheis, Konigstein, Taunus, Kurt Schimmelschmidt, Frankfurt am Main, Hermann Hoffmann, Bad Soden, Taunus, and Edwin Baier, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 18, 1960, Ser. No. 22,718
Claims priority, application Germany Apr. 24, 1959
6 Claims. (Cl. 260—176)

The present invention relates to new water-soluble azo-dyestuffs containing one or more thiosulfuric acid groups and to a process for preparing them; more particularly it relates to dyestuffs of the following general formula

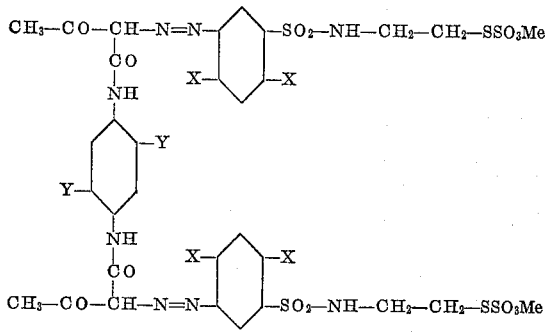

in which one X on each of the benzene rings stands for hydrogen and the other X for hydrogen, methyl, methoxy or chlorine, one Y stands for hydrogen or methoxy and the other Y stands for hydrogen, methyl, methoxy or chlorine, and Me represents an alkali metal or ammonium.

We have found that aromatic amines containing one or more thiosulfuric acid groups bound to the aromatic nucleus, via bridge members interrupted by hetero atoms, can be diazotized and reacted with compounds capable of being coupled to obtain azo-dyestuffs soluble in water.

It was known that compounds containing thiosulfuric acid groups are converted into disulfides by oxidizing agents such, for example, as iodine. Since nitrous acid liberates iodine from iodides, it could be assumed that nitrous acid forms also disulfides when acting on compounds containing thiosulfuric acid groups. The more surprising is the observation that aromatic amines containing thiosulfuric acid groups can be diazotized without difficulty and without the formation of disulfides. The only exception are the ortho-amino-aryl-thiosulfuric acids and the substitution products thereof, since these compounds are converted during the diazotization into non-coupling ortho-arylene-diazo-sulfides (German Patent 120,540). The para-amino-phenylthiosulfuric acid obtainable according to German Patent 120,540 is said to be diazotizable but actually yields the 4,4'-diamino-diphenyl-disulfide which is diazotizable as could be expected (J. Chem. Soc. London, 1930, 2691).

Due to the sensitivity of the thiosulfuric acid groups, the amino-aryl-thiosulfuric acids are diazotized in the cold, preferably at a temperature ranging from 0° C. to +5° C. Such amino-aryl-thiosulfuric acids that are difficultly soluble in water, can be indirectly diazotized by introducing them in the form of their easily soluble alkali metal salts in admixture with alkali nitrite into an acid. In some cases it is advisable to carry out the diazotization with the use of organic solvents soluble in water such, for example as acetone. The diazonium salts of aryl-thiosulfuric acids obtained in this manner frequently crystallize as hybrid ions in the form of interior salts.

Depending on their constitution the diazotized amino-aryl-thiosulfuric acids are reacted with compounds capable of being coupled in an acid, neutral or alkaline solution, and the azo-dyestuffs thus obtained which are easily soluble in water are isolated by the addition of salt.

The water-soluble azo-dyestuffs obtained by the process of the present invention which contain, for example, 1 to 4 thiosulfuric acid groups in the molecule are advantageously prepared in the form of their well crystallizing alkali metal or ammonium salts, since the dyestuffs containing free thiosulfuric acid groups tend to instability unless they are obtained as inner salts. The dyestuffs are suitable for dyeing and printing wool, silk, leather, polyamides or polyurethanes from an acid bath and yield yellow, orange, red, brown, blue and green dyeings which mostly possess good properties of fastness.

The following serve to illustrate the invention but they are not intended to limit it thereto, the parts being by weight unless otherwise stated, and the relationship of parts by weight to parts by volume being the same as that of the kilogram to the liter:

A solution of 18.7 parts of 3-amino-benzene-sulfonyl-amino-β-ethyl-thiosulfuric acid and 6 parts of sodium bicarbonate in 100 parts by volume of water to which 4.4 parts of sodium nitrite have been added, is run at 0° C. into a mixture of 24 parts by volume of concentrated hydrochloric acid and 100 parts by volume of water. The suspension of the diazonium salt thus prepared is adjusted to a pH value of 5 to 6 by means of sodium bicarbonate. Into this suspension is then run a solution of 10 parts 1,4 - di-(acetoacetylamino)-2-chloro-5-methoxybenzene in 50 parts by volume of water and 5 parts by volume of a sodium hydroxide solution of 33% strength. The mixture is brought into a stirrable state by the addition of acetone and heated to 60° C. whereby the dyestuff formed is obtained in crystalline form. It is filtered off and dried at 60° C. The dyestuff dyes wool fast greenish yellow tints.

The dyestuffs listed in the following table were prepared in like manner. They yield on natural protein fibers, such as wool and silk, and on polyamide and polyurethane fibers dyeings which possess a very good fastness to wet processing.

| Diazo Component | Coupling Component | Tint |
| --- | --- | --- |
| 3-amino-benzyl-thiosulfuric acid. | 1,4-di-(acetoacetylamino)-benzene. | greenish yellow. |
| 4-amino-benzene-sulfonyl-amino-β-ethyl-thiosulfuric acid. | do | reddish yellow. |
| 3-amino-6-chloro-benzene-sulfonyl-amino-β-ethyl-thiosulfuric acid. | do | Do. |
| 3-amino-benzene-sulfonyl-(methylamino)-β-ethyl-thiosulfuric acid. | do | greenish yellow. |
| 4-amino-benzoylamino-β-ethyl-thiosulfuric acid. | do | golden yellow. |
| 3-amino-benzene-sulfonyl-amino-β-ethyl-thiosulfuric acid. | do | reddish yellow. |
| Do | 1,4-di-(acetoacetylamino)-2-chloro-5-methoxy benzene. | greenish yellow. |

| Diazo Component | Coupling Component | Tint |
|---|---|---|
| 3-amino-benzyl-thiosulfuric acid. | 1,4-di-(acetoacetylamino)-2-chloro-5-methoxy benzene. | golden yellow. |
| 3-amino-6-methyl-benzene-sulfonylamino-β-ethyl-thiosulfuric acid. | ⎯⎯do⎯⎯ | greenish yellow. |
| 3-amino-4-methoxy-benzene-sulfonylamino-β-ethyl-thiosulfuric acid. | ⎯⎯do⎯⎯ | golden yellow. |
| 3-amino-benzene-sulfonyl-(cyano-ethyl-amino)-β-ethyl-thiosulfuric acid. | ⎯⎯do⎯⎯ | greenish yellow. |
| 4-amino-benzoylamino-β-ethyl-thiosulfuric acid. | 1,4-di-(acetoacetylamino)-2-chloro-benzene. | Do. |
| 3-amino-4-methoxy-benzene-sulfonylamino-β-ethyl-thiosulfuric acid. | ⎯⎯do⎯⎯ | Do. |
| Do⎯⎯ | 2,5-di-(acetoacetylamino)-toluene. | golden yellow. |
| 3-amino-benzene-sulfonyl-(methylamino)-β-ethyl-thiosulfuric acid. | ⎯⎯do⎯⎯ | yellow. |
| 3-amino-benzene-sulfonyl-amino-β-ethyl-thiosulfuric acid. | ⎯⎯do⎯⎯ | golden yellow. |
| Do⎯⎯ | 2,5-di-(acetoacetylamino)-anisol. | Do. |
| 3-amino-4-methoxy-benzene-sulfonylamino-β-ethyl-thio-sulfuric acid. | ⎯⎯do⎯⎯ | Do. |
| 3-amino-benzene-sulfonyl-(methylamino)-β-ethyl-thiosulfuric acid. | ⎯⎯do⎯⎯ | yellow. |
| 3-amino-4-methoxy-benzene-sulfonylamino-β-ethyl-thiosulfuric acid. | 2,5-di-(acetoacetylamino)-hydroquinone-dimethyl ether. | golden orange. |
| 3-amino-benzene-sulfonyl-amino-β-ethyl-thiosulfuric acid. | ⎯⎯do⎯⎯ | Do. |

We claim:
1. Water-soluble disazo-dyestuffs of the formula

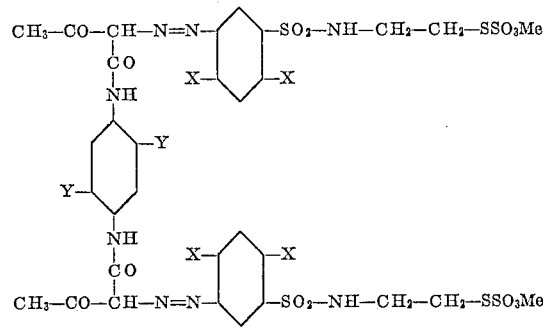

wherein one X on each of the benzene nuclei stands for hydrogen and the other X for a member of the group consisting of hydrogen, methyl, methoxy and chlorine, one Y stands for a member of the group consisting of hydrogen and methoxy and the other Y for a member of the group consisting of hydrogen, methyl, methoxy and chlorine, and Me represents a member of the group consisting of alkali metals and ammonium.

2. A dyestuff of the formula

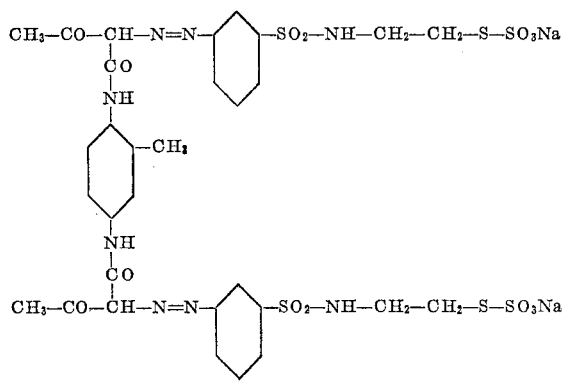

3. A dyestuff of the formula

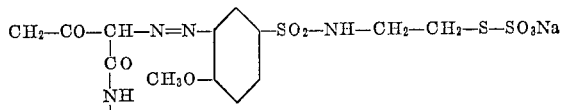

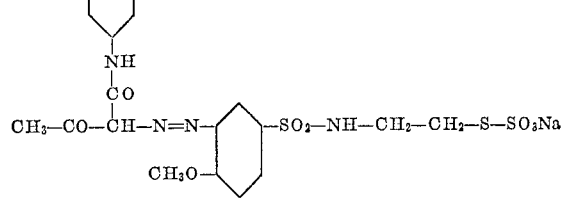

4. A dyestuff of the formula

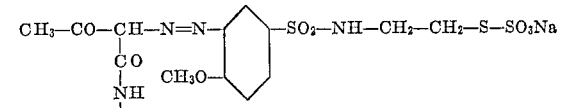

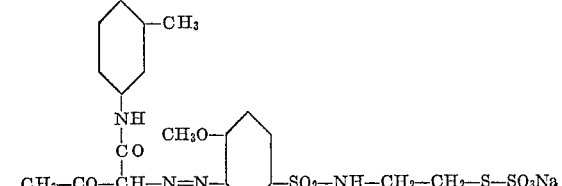

5. A dyestuff of the formula

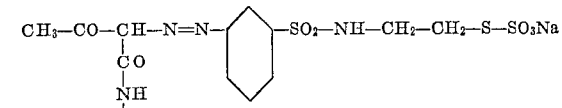

6. The dyestuff of the formula:

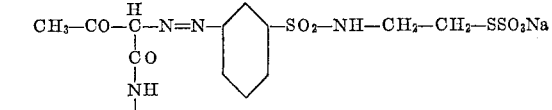

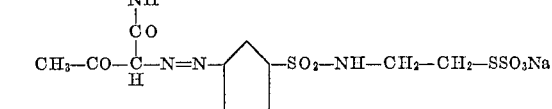

References Cited in the file of this patent
UNITED STATES PATENTS

| 2,245,971 | Felix et al. | June 17, 1941 |
| 2,283,326 | Felix et al. | May 19, 1942 |
| 2,706,200 | Lecher et al. | Apr. 12, 1955 |

FOREIGN PATENTS

| 490,945 | Great Britain | Aug. 24, 1938 |